United States Patent [19]

Machida et al.

[11] Patent Number: 5,015,674

[45] Date of Patent: May 14, 1991

[54] COMPOSITION OF VINYL POLYMER-GRAFTED, SILICONE POLYMER-MODIFIED EPOXY RESIN AND POLYMALEIMIDE

[75] Inventors: Koichi Machida; Mikio Kitahara; Takayuki Kubo; Motoyuki Torikai, all of Yokohama; Koutarou Asahina, Kamakura, all of Japan

[73] Assignee: Mitsui Toatsu Chemicals, Inc., Tokyo, Japan

[21] Appl. No.: 386,700

[22] Filed: Jul. 31, 1989

[30] Foreign Application Priority Data

Aug. 5, 1988 [JP] Japan ................................ 63-194536
Aug. 9, 1988 [JP] Japan ................................ 63-197096

[51] Int. Cl.$^5$ ...................... C08L 63/02; C08L 63/04; C08L 63/10
[52] U.S. Cl. .................... 523/435; 523/436; 523/427; 523/428; 523/433; 525/476; 525/487; 525/502; 525/530
[58] Field of Search ............... 525/524, 530, 529, 476, 525/487, 502; 523/427, 428, 433, 435, 436

[56] References Cited

U.S. PATENT DOCUMENTS

| | | | |
|---|---|---|---|
| 3,577,263 | 5/1971 | Nordstrom | 525/531 |
| 4,510,272 | 4/1985 | Loszewski | 525/530 |
| 4,707,529 | 11/1987 | Hoffmann et al. | 525/529 |
| 4,831,102 | 5/1989 | Yamaya et al. | 528/220 |
| 4,904,761 | 2/1990 | Okitsu et al. | 523/435 |

FOREIGN PATENT DOCUMENTS 62-270617 11/1987 Japan.
62-273222 11/1987 Japan.

*Primary Examiner*—Allan M. Lieberman
*Assistant Examiner*—Robert E. L. Sellers, II
*Attorney, Agent, or Firm*—Burns, Doane, Swecker & Mathis

[57] ABSTRACT

A resin composition for sealing semiconductors which comprises (a) an epoxy resin, (b) a hardening agent, (c) an inorganic filler and (d) a polymaleimide having a specific structure is herein provided. Preferably, the resin composition comprises, as all of or a part of the epoxy resin, a modified epoxy resin composed of (i) a graft polymer of an epoxy resin and a vinyl polymer and (ii) a silicone polymer in an oily state or as particles having an average particle size of not more than 1.0 micron, which are uniformly dispersed in the graft polymer. The resin composition for sealing semiconductors exhibits a low thermal expansion coefficient and a low elastic modulus, generates low stress when thermal shock is applied thereto and exhibits high heat resistance during soldering even after moisture absorption. Therefore, if the composition is used to seal semiconductor devices on a large scale having degree of integration or small-sized, thin semiconductors such as flat packages, these semiconductors provide high reliability.

18 Claims, No Drawings

COMPOSITION OF VINYL POLYMER-GRAFTED, SILICONE POLYMER-MODIFIED EPOXY RESIN AND POLYMALEIMIDE

BACKGROUND OF THE INVENTION

1. Field of the Invention

The present invention relates to a resin composition for sealing semiconductor elements or devices (hereinafter simply referred to as "semiconductor(s)"). The resin composition has a low elastic modulus and a low thermal expansion coefficient which does not adversely affect the heat resistance of the semiconductors, and which is excellent in thermal shock resistance and heat resistance during soldering and is therefore useful for sealing electronic parts such as semiconductors where high-reliability is required.

2. Description of the Prior Art

Recently, so-called plastic sealing methods using thermo-setting resins represented by epoxy resins have been employed for sealing semiconductors. This is due to economical merits such as low price of the starting materials and ease of mass production. In particular, resins mainly used for sealing are resin compositions principally composed of polyfunctional epoxy resins, novolak type phenol resins and an inorganic filler because of their excellent heat resistance, moldability and electrical properties.

On the other hand, the degree of integration of semiconductor chips has been increased and correspondingly the chips have also been scaled up. Contrary to the scaling up of chips, there has been a tendency for the shape of the chip-containing packages to be made more compact and thinner as in the case of flat packages which is accompanied by changing to high density packaging on a substrate and surface mounting. For this reason, failures have occurred which have not been encountered with the conventional resins for sealing. More specifically, when thermal shock is applied, stress generated in the sealing resin due to the difference in the thermal expansion coefficients between the resin and the chip causes adverse phenomena such as the formation of cracks in the passivating film and cracks in the resin for sealing and a shift of aluminum wiring because of the scaling up of the chips and the reduction in thickness of the resin layer.

Moreover, since the package itself is exposed to a high temperature in a bath of solder during soldering, when surface mounting is performed, the moisture in the package is quickly evaporated. This in turn causes adverse phenomena such as the formation of cracks in the package, thereby lowering the humidity resistance of the semiconductors and hence reduction in the reliability thereof.

Accordingly, it has been desired to develop resins for sealing semiconductors which have reduced stress and excellent heat resistance during soldering even after moisture absorption.

Stress generated in the chip is expressed by the product of the elastic modulus of the resin and the difference in the thermal expansion coefficients between the resin and the chip. One method for reducing such stress is to make the thermal expansion coefficient of the resins small thereby minimizing the difference between the thermal expansion coefficient of the resin and a chip, but the difference is generally large and thus a large amount of inorganic fillers having a low thermal expansion coefficient must be incorporated into the resin to minimize such difference. A large amount of inorganic fillers has already been used practically in such a resin for sealing and, therefore, a further increase in the amount thereof would result in the deterioration of the moldability of the resulting resin composition. On the other hand, it has also been tried to use a plasticizer, a flexible epoxy resin or a phenol resin for the purpose of decreasing the elastic modulus of a resin to thus minimize the stress generated in a resin for sealing during thermal shock, but the hardened product obtained from these methods shows insufficient heat resistance.

Our Japanese Patent Un-examined Publication Nos. Sho 62-270617 and Sho 62-273222 disclose methods for reducing the stress generated in a resin composition during thermal shock while maintaining the desired heat resistance thereof, which comprise uniformly dispersing silicone polymer particles having an average particle size of not more than 1.0 micron in a graft polymer of an epoxy resin and a vinyl polymer. These methods are effective for lowering the stress, but they cannot completely solve the problem of heat resistance during soldering after moisture absorption. More specifically, cracks are formed in a package which absorbs water when it is exposed to an elevated temperature, such as those encountered with a bath of solder, which temperature is higher than the glass transition point of the sealing resin.

SUMMARY OF THE INVENTION

Accordingly, an object of the present invention is to provide a resin composition for sealing semiconductors which satisfactorily fulfills various requirements for resins that are suitable for sealing semiconductors such as integrated circuits having a high degree of integration where high reliability is required. Such requirements are, for instance, low stress generated in the resin for sealing and applied on the semiconductors, high thermal shock resistance and heat resistance during soldering even after moisture absorption.

The inventors of the present invention have conducted various studies to develop a resin composition for sealing semiconductors, have found that those obtained by using an epoxy resin along with a polymaleimide compound having a specific structure is excellent in heat resistance during soldering, have found that those obtained by using, as an epoxy resin, a modified epoxy resin prepared by methods disclosed in our Japanese Patent Un-examined Publication Nos. Sho 62-270617 and Sho 62-373222 generates low stress and thus have completed the present invention.

According to the present invention, there is provided a resin composition for sealing semiconductors which comprises, (a) an epoxy resin, (b) a hardening agent, (c) an inorganic filler, and (d) a polymaleimide presented by the following general formula (I):

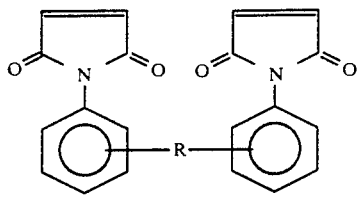

(I)

(in formula (I), R represents a bivalent group selected from the group consisting of

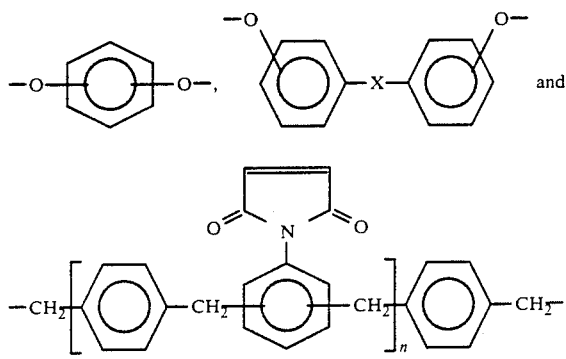

and wherein X represents a direct bond, a bivalent hydrocarbon group having 1 to 10 carbon atoms, a hexafluorinated isopropylidene group, a carbonyl group, a thio group, a sulfinyl group, a sulfonyl group or an oxide and n represents an average number of the units enclosed in brackets ranging from 0 to 10).

The epoxy resins as used herein for component (a) may be any epoxy resin commonly used so far as they are polyvalent epoxy resins. Novolak epoxy resins such as glycidyl ethers of phenol-novolak and cresol novolak resins are preferred from the points of view of heat resistance and electric properties. In addition to these preferred ones, specific examples which may be used in the present invention include glycidyl ethers of compounds having at least two active hydrogen atoms per molecule, for example, glycidyl epoxy resins obtained by reacting polyhydric phenols, e.g., bisphenol A, bishydroxydiphenyl methane, resorcinol, bishydroxydiphenyl ether and tetrabromobisphenol A; polyhydric alcohols, e.g., ethylene glycol, neopentyl glycol, glycerin, trimethylolpropane, pentaerythritol, diethylene glycol, polypropylene glycol, bisphenol A-ethylene oxide adducts and trishydroxyethyl isocyanurate; amine compounds, e.g., ethylenediamine and aniline; or polyvalent carboxylic compounds, e.g., adipic acid, phthalic acid and isophthalic acid with epichlorohydrin or 2-methylepichlorohydrin; and epoxy resins of aliphatic (inclusive of alicyclic) compounds, e.g., dicyclopentadiene diepoxide and butadiene dimer diepoxide. These epoxy resins may be used alone or in combination.

In the present invention, it is preferable to use, as an epoxy resin, a modified epoxy resin composed of an epoxy resin and a silicone polymer in an oily state or as particles having an average particle size of not more than 1.0 micron, which are uniformly dispersed in the epoxy resin, from the point of view of low stress generated in the resin composition. The silicone polymer may be any silicone polymer commonly used as long as they are able to be dispersed in the epoxy resin, in an oily state or in a particulate state of not more than 1.0 micron. Specific examples thereof include silicone oils having functional groups such as epoxy, glycidyl, amino, carboxyl and hydroxyl groups for compatibility with epoxy resins, and silicone resins and silicone rubbers which are finely-divided to an average particle size of not more than 1.0 micron. These silicone polymers may be used alone or in combination.

In the present invention, it is more preferable to use, as an epoxy resin or as a part of the epoxy resin, a modified epoxy resin composed of (1) a graft polymer of an epoxy resin and a vinyl polymer and (2) silicone rubber particles obtained by addition-reacting a silicone polymer capable of undergoing an addition reaction and/or a soft vinyl-modified silicone polymer in an oily state or as particles having an average particle size of not more than 1.0 micron, which are uniformly dispersed in the epoxy resin, from the point of view of achieving effectively the object of the present invention.

The epoxy resins used in the preparation of the modified epoxy resin may be any epoxy resins commonly used as long as they are polyvalent epoxy resins. The graft polymer of an epoxy resin and a vinyl polymer is typically prepared by polymerizing vinyl monomers in the presence of the foregoing epoxy resin to thus form the aforesaid vinyl polymer. Typical examples of vinyl monomers for obtaining the vinyl polymers include alkenyl aromatic compounds such as styrene and vinyl toluene; acrylic esters such as methyl methacrylate, dodecyl methacrylate, butoxyethyl methacrylate, glycidyl methacrylate, methyl acrylate, butyl acrylate, 2-ethylhexyl acrylate, hydroxyethyl acrylate trimethylolpropane triacrylate; acrylic compounds free of ester groups such as acrylonitrile, acrylic acid, butoxymethyl acrylamide and methacrylamide; non-conjugated vinyl compounds such as vinyl acetate, vinyl laurate, vinyl versatate, vinyl chloride, vinylidene chloride, ethylene and allyl acetate; and conjugated diene compounds such as butadiene, isoprene and chloroprene. It is also possible to use polymerizable vinyl compounds such as vinyl silicone, dibutyl fumarate, monomethyl maleate, diethyl itaconate and fluorinecontaining compounds of acrylic and methacrylic acids, for instance, trifloroethyl methacrylate and tetrafluoropropyl methacrylate. The amount of the vinyl monomers is not restricted to a specific value, but in general ranges from 1 to 50 parts by weight per 100 parts by weight of the epoxy resin.

To obtain vinyl polymers by polymerizing the aforesaid vinyl monomers, they are generally subjected to free radical polymerization in the presence of a free radical polymerization initiator of which typical examples include a peroxide such as lauroyl peroxide, benzoyl peroxide tert-butyl perbenzoate, dimethyl dibenzoyl peroxyhexane, tert-butyl perpivalate, di-tert-butyl peroxide, 1,1-bis-tert-butylperoxy-3,3,5-trimethylcyclohexane, dimethyl di-tert-butyl peroxyhexane, tert-butyl cumyl peroxide, methyl ethyl ketone peroxide, cyclohexanone peroxide, cumene hydroperoxide, tert-butylperoxy allyl carbonate, dioctylperoxy dicarbonate, tert-butyl peroxymaleate, peroxysuccinic acid, tert-butyl peroxyisopropyl carbonate and hydrogen peroxide; and an azo compound as such azobisisobutyronitrile and azobisdimethyl valeronitrile. The amount of these free radical initiators ranges from 0.1 to 10% by weight based on the weight of the vinyl monomer.

Alternatively, these vinyl monomers may be simultaneously subjected to a so-called redox polymerization optionally utilizing a reducing agent. A polymerization inhibitor such as hydroquinone and a chain transfer agent such as dodecyl mercaptan may also be used in such a polymerization.

It is also effective to introduce, into the epoxy resin, chemical bonds capable of undergoing graft polymerization such as polymerizable double bonds to promote the graft polymerization. Typically, the polymerizable double bonds can be introduced into the epoxy resin, for instance, by previously reacting the epoxy resin with a compound having both a functional group and a polymerizable double bond such as acrylic acid, acrylamide, methylol acrylamide, butoxymethyl acrylamide, hydroxymethyl methacrylate, glycidyl methacrylate, maleic anhydride, monoethyl itaconate, monobutyl fumarate, chloromethyl styrene, phosphoxyethyl methacrylate, chlorohydroxypropyl methacrylate, p-hydroxystyrene and dimethylaminoethyl methacrylate. When using such a compound simultaneously having a polymerizable double bond and a functional group, the amount thereof ranges from 0.1 to 10 parts by weight per 100 parts by weight of the epoxy resin.

In the present invention, some of the foregoing epoxy resin and the vinyl polymers may remain in the foregoing graft polymer in their free state without undergoing graft polymerization.

The modified epoxy resins used in the present invention may be obtained by addition-reacting a silicone polymer capable of undergoing an addition reaction according to known techniques or by polymerizing a monomer capable of forming a soft vinyl-modified silicone polymer by known techniques, in the presence of the aforementioned graft polymer of an epoxy resin and a vinyl polymer.

The addition-reacted silicone rubber is a rubber formed by addition reacting a vinyl-modified silicone polymer having vinyl groups in the molecule with a hydrogen-modified silicone polymer having active hydrogen atoms in the molecule through a silylation reaction.

The term "vinyl-modified silicone polymer(s)" used herein means polysiloxanes having at least one Si—CH=CH$_2$ bond at the terminal or in the middle of the molecule and the term "hydrogen-modified silicone polymer(s)" means polysiloxanes having at least two Si-H bonds at the terminal or in the middle of the molecule. They are usually put on the market in the form of combinations thereof and examples thereof are SE-1821 available from Toray Silicone Industries, Inc. and KE-1204 available from Shin-Etsu Chemical Co., Ltd.

The soft vinyl-modified silicone polymer used in the composition of this invention is a polymer based o vinyl-modified silicone and has a glass transition temperature Tg of not higher than 20° C. The term "a polymer based on vinylmodified silicone" used herein means a homopolymer or copolymer of vinyl-modified silicones or a copolymer of a vinyl-modified silicone and one or more of other vinyl monomers. In the present invention, any commercially available vinyl-modified silicone can be used. Examples of the vinyl-modified silicone are methacryloxypropyl siloxanes represented by the general formula:

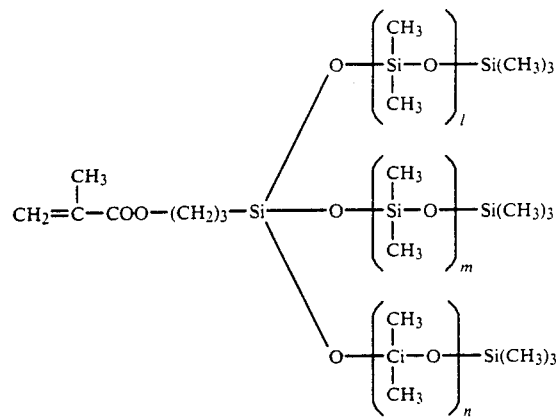

wherein, $0 \leq l$, m, $n \leq 1000$;
vinyl siloxanes represented by the general formula:

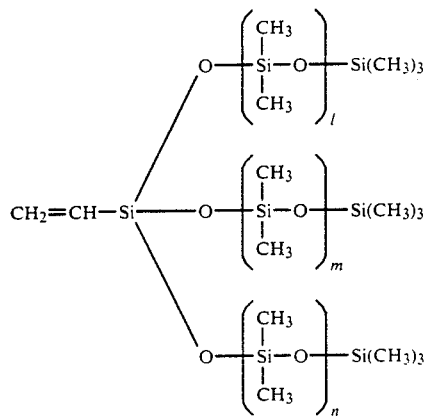

wherein, $0 \leq l$, m, $n \leq 1000$;
and functional silanes represented by the general formula:

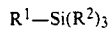

wherein $R^1$ represents methacryloxy, vinyl, allyl or allyloxy group and $R^2$ represents an alkyl and/or an alkoxy group.

In addition, examples of other vinyl monomers are any of the monomers listed above in connection with the formation of the graft polymers. The amount of the vinyl monomer other than vinyl-modified silicones in the copolymer is such that the resulting copolymer becomes soft or is in a liquid or rubber-like state and that the average particle size thereof is not more than 1.0 micron. The amount of vinyl monomer varies depending on the kinds of monomers used, but in general the amount thereof is not more than 80% by weight on the basis of the total weight of the monomers used for forming such a copolymer.

To achieve the intended improvement in stress and heat resistance, the average particle size of the addition-reacted silicone rubber and the soft vinyl-modified silicone polymer (hereunder referred to as silicone polymer) should be not more than 1.0 micron, preferably not more than 0.5 micron and more preferably not less than 0.01 and not more than 0.2 micron. This is because if the average particle size of the silicone polymer exceeds 1.0 micron, the intended effect of lowering the stress cannot be achieved and likewise the heat resistance is not improved. The control of the particle size of the silicone polymer may be performed by appropriately selecting the kind and amount of the vinyl polymer from which the graft polymer is prepared together with the epoxy resin; and the specific polymer and monomer compositions for forming the silicone polymer as well as the number of the polymerizable double bonds to be introduced into the epoxy resin. The amount of a specific monomer used to form the silicone polymer is not limited to a specific level, but in general it ranges from 1 to 100 parts by weight per 100 parts by weight of the epoxy resin.

In the present invention, the amount of the epoxy resin of the component (a) preferably ranges from 3 to 67% by weight on the basis of the total weight of the component (a), the component (b) and the component (d), as defined above. In the preferred embodiment of the present invention, the modified epoxy resin is used as all of the component (a) or as a part of the component (a). The amount of the modified epoxy resin depends on the ratio of the silicone polymer to the final resin composition for sealing semiconductors and may be easily determined by those skilled in the art on the basis of the amount of the silicone polymer required for the final resin composition and that of the silicone polymer to be incorporated into the modified epoxy resin.

Moreover, the amount of the silicone polymer should be 1 to 30% by weight, in particular 2 to 20% by weight on the basis of the total weight of the component (a), the component (b) and the component (d). This is because, if it is less than 1% by weight, the resulting resin composition cannot provide the intend low stress, while if it exceeds 30% by weight, the flowability of the resin is lowered and its molding properties are impaired.

In the present invention, any conventional hardening agent can be used as the component (b). Examples of the hardening agent include novolak type phenol resins obtained by reacting phenols such as phenol or an alkylphenol with formaldehyde or paraformaldehyde as well as modified novolak type phenol resins, phenol aralkyl resins, resorcinol aralkyl resins and polyhydric phenols such as trihydroxyphenylmethane and tetrahydroxyphenylethane, commonly used amine type hardening agent such as diethylenetriamine, triethylenetetramine, isophoronediamine, diaminodiphenylmethane, diaminodiphenylsulfone, n-phenylenediamine and dicyandiamide and commonly used acid anhydrides such as phthalic anhydride, hexahydrophthalic anhydride, nadic methyl anhydride, pyromellitic dianhydride and benzophenonetetracarboxylic dianhydride. These hardening agents may be used alone or in combination.

The amount of the hardening agents to be incorporated in the composition ranges from 0.1 to 10 and preferably 0.5 to 2.0 expressed in equivalent weight ratio based on the total amount of the epoxy resin (component (a)).

Examples of the inorganic fillers used herein as component (c) include powders of crystalline silica, fused silica, alumina, talc, calcium silicate, calcium carbonate, mica, clay, titanium white or the like; as well as glass fibers, carbon fibers or the like. These fillers may be employed alone or in combination, and generally crystalline silica powder or fused silica powder is used alone or in combination from the viewpoint of their properties such as thermal expansion coefficient and thermal conductivity. These silicas are amorphous or spherical. The amount thereof to be incorporated into the composition preferably ranges from 100 to 800 parts by weight per 100 parts by weight of the sum of the component (a), the component (b) and the component (d). If it is less than 100 parts by weight, the thermal expansion coefficient of the resulting resin composition is extremely high and good thermal shock resistance is not attained, while if it exceeds 800 parts by weight, the resulting resin composition is not practically acceptable since the flowability thereof is lowered and hence its moldability is greatly impaired.

The polymaleimide compounds represented by the general formula (I) used herein as component (d) can easily be prepared by condensing and dehydrating a polyamine compound represented by the following general formula (II) or (III) with maleic anhydride by known techniques:

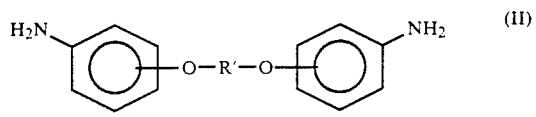

preferably

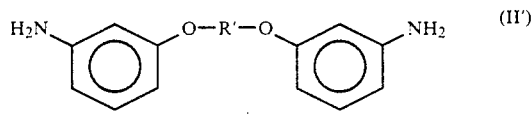

(in formula (II) or (II'), R' represents a bivalent group selected from the group consisting of

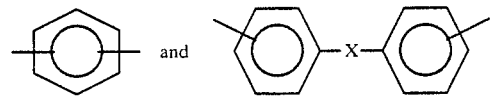

(wherein X represents a direct bond, a bivalent hydrocarbon group having 1 to 10 carbon atoms, a hexafluorinated isopropylidene group, a carbonyl group, a thio group, a sulfinyl group, a sulfonyl group or an oxide).

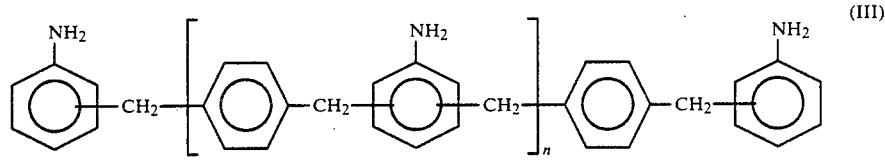

(in the formula, n is an average number of the units enclosed in brackets ranging from 0 to 10.)

Specific examples of the polymaleimide compounds represented by the general formula (I) are 1,3-bis(3-maleimidephenoxy)benzene, bis[4-(3-maleimidephenoxy)phenyl]methane, 1,1-bis[4-(3-maleimidephenoxy)phenyl]ethane, 1,2-bis[4-(3-maleimidephenoxy)-phenyl]ehtane, 2,2-bis[4-(3-maleimidephenoxy)phenyl]propane, 2,2-bis[4-(3-maleimidephenoxy)phenyl]butane, 2,2-bis[4-(3-maleimidephenoxy)phenyl]1,1,1,3,3,3-hexafluoropropane, 4,4'-bis(3-maleimidephenoxy)biphenyl, bis[4-(3-maleimidephenoxy)-phenyl]ketone, bis[4-(3-maleimidephenoxy)phenyl]sulfide, bis[4-3-maleimidephenoxy)phenyl]sulfoxide, bis[4-(3-maleimidephenoxy)phenyl]sulfone and bis[4-(3-maleimidephenoxy)-phenyl]ether as well as polymaleimide compounds represented by the following general formula:

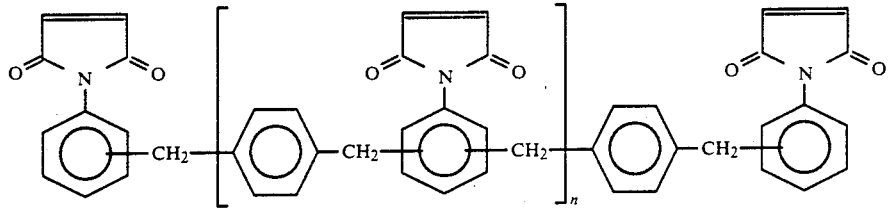

(in the formula, n is an average number of the units enclosed in brackets ranging from 0 to 10).

These polymaleimides may be used alone, in mixture thereof or in combination with other polymaleimides. The amount of the polymaleimides used ranges from 30 to 80% by weight on the basis of the total amount of the component (a), component (b) and component (d).

In the present invention, the resin composition may be prepared by, for instance, blending every component and kneading the resulting blend according to known techniques; or previously dissolving the polymaleimide component (d) in all of or a part of component (a) and/or component (b); or reacting the same to form a prepolymer. In particular, the use of such a prepolymer is favorable from the viewpoint of molding properties and hardening properties of the resultant resin composition.

It is suitable in the present invention to use a curing promoter in order to harden the resin composition. The curing promoters include imidazoles such as 2-methylimidazole and 2-methyl-4-ethylimidazole; amines such as triethanolamine, triethylenediamine and tris(3,6-dioxyheptyl)amine; organic phosphines such as tributylphosphine, triphenylphosphine and tritolylphosphine; tetraphenylborates such as tetraphenylphosphonium tetraphenylborate and triethylammonium tetraphenylborate; 1,8-diazabicyclo(5,4,0)undecene-7 and derivatives thereof. The amount of these curing promoters to be used preferably ranges from 0.1 to 10 parts by weight per 100 parts by weight of the total amount of component (a), component (b) and component (d).

In addition, it is also possible to simultaneously use, as optional components, organic peroxides and/or azo compounds. Examples of the organic peroxides are dialkyl peroxides such as di-t-butyl peroxide, t-butylcumyl peroxide, dicumyl peroxide, 1,3-bis(t-butylperoxyisopropyl)benzene, 1,1-d-t-butylperoxy-3,3,5-trimethyl cyclohexane and 1,1-di-t-butylperoxy cyclohexane; and alkyl peresters such as t-butyl perbenzoate. Examples of the azo compounds are azobisisobutylonitrile and azobisdimethylvaleronitrile.

The amount of these organic peroxides and/or the azo compounds preferably ranges from 0.1 to 5 parts by weight per 100 parts by weight of the bismaleimide compound.

The resin composition of the present invention may be formed into a molding material by blending the foregoing components and optionally various additives, a variety of reaction diluents, silane coupling agents, releasing agents, coloring agents and flame retardants and then mixing and kneading the resultant blend.

The resin composition for sealing semiconductors according to the present invention may easily be formed into a molding material by sufficiently premixing the ingredients explained above in, for instance, a mixer, then kneading in a melt mixing apparatus such as with a heated roller or a kneader and cooling and pulverizing the resulting mixture.

EXAMPLES

The present invention will hereunder be explained in more detail with reference to the following Examples, but it is not intended to restrict the invention to these specific Examples. In the following Examples, the term "part(s)" means "part(s) by weight" unless otherwise specified.

PREPARATION OF MODIFIED EPOXY RESIN

Preparation Example 1

100 parts of ortho-cresol-novolak epoxy resin (epoxy eq. =217), 10 parts of toluene and one part of methacrylic acid were reacted at a temperature of 120° to 125° C. for 2 hours in the presence of tetradecyl dimethyl benzyl ammonium chloride. To the reaction product were then added 5 parts of butyl acrylate, 10 parts of methacryloxypropyl siloxane oligomer (available from Shin-Etsu Chemical Co., Ltd.), 0.4 part of azobisisovaleronitrile and 100 parts of ethyl acetate which was allowed to react at 75° C. for additional 4 hours. Further, 10 parts of a vinyl-modified polysiloxane and 10 parts of a hydrogen-modified polysiloxane (both of these are available from Shin-Etsu Chemical Co., Ltd.: KE-1204) as silicone polymers capable of undergoing an addition reaction were added to the reaction product and they were reacted for 2 hours with vigorous agitation. Thereafter, the product was treated at 130° C. under a reduced pressure to remove the solvents and to thus obtain a modified epoxy resin (a-1) (epoxy eq. =295) in which silicone rubber particles having an average particle size of 0.35 micron were dispersed.

PREPARATION EXAMPLE 2

The same procedures as in Preparation Example 1 were repeated except that the amount of methacrylic acid was changed to 1.2 part and those of the vinyl-modified polysiloxane and the hydrogen-modified polysiloxane were changed to 30 parts respectively to thus obtain a modified epoxy resin (a-2) (epoxy eq. =320) in which silicone rubber particles having an average particle size of 0.35 micron were dispersed.

PREPARATION EXAMPLE 3

100 Parts of ortho-cresol-novolak resin (epoxy eq. =217), 10 parts of toluene and one part of methacrylic acid were reacted at a temperature of 120° to 125° C. for 2 hours in the presence of tetradecyl dimethyl benzyl ammonium chloride and then there were added, to the resulting product, 3.6 parts of butyl acrylate, 0.1 part of glycidyl methacrylate and 0.05 part of t-butylperoxy-2-ethyl hexanoate to react them at 100° C. for one hour. The reaction was continued for 4 hours while dropwise adding 30 parts of methacryloxypropyl siloxane, 0.6 part of neopentyl glycol diacrylate and 0.15 part of 1,1-bis(t-butylperoxy)-3,3,5-tricyclohexane, followed by continuing the reaction for additional 4 hours and removing the solvent under reduced pressure to thus obtain a modified epoxy resin (a-3) (epoxy eq. =295) in which soft vinyl-modified silicone polymer particles having an average particle size of 0.35 micron were dispersed.

PREPARATION EXAMPLE 4

The same procedure as in Preparation Example 3 was repeated except that amounts of methacrylic acid, butyl acrylate, methacryloxypropyl siloxane and neopentyl glycol diacrylate were changed to 1.2 part, 5.0 parts, 55 parts and 1.0 part respectively to thus obtain a modified epoxy resin (a-4) (epoxy eq. =315) in which soft vinyl-modified silicone polymer particles having an average particle size of 0.2 to 0.5 micron were dispersed.

EXAMPLE 1 TO 12

An epoxy resin, a bismaleimide compound represented by the general formula (I), a hardening agent, a curing promotor, silica powder, a silane coupling agent, a wax, a coloring agent, a flame retardant and the like were blended in amounts (parts by weight) as described in Table I followed by heating and mixing them for 5 minutes with rollers heated to 110° to 120° C., cooling, pulverizing the rolled product and compressing the pulverized product to obtain resin compositions as molding materials.

COMPARATIVE EXAMPLE 1 AND 2

In the same manner as in Examples 1 to 12, an epoxy resin, a bismaleimide compound, a hardening agent and other components were blended and mixed together in amounts (parts by weight) as listed in Table I which were beyond the ranges of this invention defined above to obtain molding materials.

COMPARATIVE EXAMPLES 4 and 4

In the same manner as in Examples 1 to 12, an epoxy resin, a novolak-phenol resin and other components were blended and mixed together in amounts (parts by weight) as listed in Table I to obtain molding materials.

From the molding materials obtained in the foregoing Examples and Comparative Examples, 100-pin flat packages (20 mm × 30 mm × 2.5 mm) provided thereon with an element (10 mm × 10 mm) for testing and test pieces for determining physical properties were formed according to a transfer molding technique (temperature: 180° C., pressure: 30 kg/cm$^2$ and molding time: 3 minutes) and then were subjected to posthardening at 180° C. for 6 hours. The results of the tests are summarized in Table II given below.

EXAMPLES 3 to 20

An epoxy resin, a polymaleimide compound having n in the general formula (I) of 3.0 on the average, a hardening agent, a curing promoter, silica powder, a silane coupling agent, a wax, a coloring agent, a flame retardant and the like were blended in amounts (parts by weight) listed in Table III and then mixed and kneaded as in the same manner as in Examples 1 to 12 to thus obtain molding materials.

COMPARATIVE EXAMPLES 5 and 6

In the same manner as in Examples 13 to 20, an epoxy resin, a bismaleimide compound, a hardening agent and other components were blended and mixed together in amounts (parts by weight) as listed in Table III which were beyond the ranges of this invention defined above to obtain molding materials.

COMPARATIVE EXAMPLES 7 and 8

In the same manner as in Examples 13 to 20, an epoxy resin, a novolak-phenol resin and other components were blended and mixed together in amounts (parts by weight) as listed in Table III to obtain molding materials.

From the molding materials obtained in the foregoing Examples 13 to 20 and Comparative Examples 5 to 8, 100-pin flat packages (20 mm × 30 mm × 2.5 mm) provided thereon with an element (10 mm × 10 mm) for testing and test pieces for determining physical properties were formed according to a transfer molding technique (molding conditions: temp., 180° C.; pressure, 30 kg/cm$^2$; and time, 3 minutes) and then were subjected to post-hardening at 180° C. for 6 hours. The results of the tests are summarized in Table IV given below.

TABLE I

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 | Comp. Ex. 3 | Comp. Ex. 4 |
|---|---|---|---|---|---|---|---|---|---|---|---|---|---|---|---|---|
| Bismaleimide Compound[1] | 20 | 20 | | | | | | 20 | 20 | 20 | 20 | | | | | |
| Bismaleimide Compound[2] | | | 20 | 20 | | | | | | | | | | | | |
| Bismaleimide Compound[3] | | | | | 20 | 20 | 20 | | | | | 20 | | | | |
| Bismaleimide Compound[4] | | | | | | | | | | | | | 20 | 20 | | |
| Novolak Phenol Resin[5] | 3 | | | | | | | 3 | 3 | 3 | 3 | 3 | 3 | 3 | 10 | 10 |
| Phenol Aralkyl Resin[6] | | 3 | 3 | | 3 | | | | | | | ' | | | | |
| Resorcinol Aralkyl Resin[7] | | | | 3 | | 3 | 3 | | | | | | | | | |
| Epoxy Resin[8] | | | | | | | | | | | 7 | 7 | 7 | | | 20 |
| Modified Epoxy Resin a-1 | 7 | 7 | 7 | 7 | 7 | 7 | 7 | | | | | | | 7 | 20 | |
| Modified Epoxy | | | | | | | | 7 | | | | | | | | |

TABLE I-continued

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 | Comp. Ex. 3 | Comp. Ex. 4 |
|---|---|---|---|---|---|---|---|---|---|---|---|---|---|---|---|---|
| Resin a-2 Modified Epoxy |  |  |  |  |  |  |  |  | 7 |  |  |  |  |  |  |  |
| Resin a-3 Modified Epoxy |  |  |  |  |  |  |  |  |  | 7 |  |  |  |  |  |  |
| Resin a-4 |  |  |  |  |  |  |  |  |  |  |  |  |  |  |  |  |
| Fused Silica | 70 | 70 | 70 | 70 | 70 | 70 | 70 | 70 | 70 | 70 | 70 | 70 | 70 | 70 | 70 | 70 |
| Triphenyl-phosphine | 0.3 | 0.3 | 0.4 | 0.3 | 0.3 | 0.4 | 0.3 | 0.3 | 0.3 | 0.3 | 0.3 | 0.3 | 0.3 | 0.3 | 0.3 | 0.3 |
| Triethyl-ammonium Tetraphenyl-borate |  | 1.0 | 0.7 |  |  |  | 1.0 |  |  | 1.0 | 1.0 | 1.0 |  |  |  |  |
| Dicumyl Peroxide | 0.2 |  |  | 0.2 | 0.2 | 0.1 |  | 0.2 | 0.2 |  |  |  | 0.2 | 0.2 |  |  |
| Silane Coupling Agent | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Carnauba Wax | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Carbon Black | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Antimony Oxide | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |

*[1] 4,4'-Bis(3-maleimidephenoxy)biphenyl (available from MITSUI TOATSU CHEMICALS, INC.)
*[2] 2,2-Bis[4-(3-maleimidephenoxy)phenyl]propane (available from MITSUI TOATSU CHEMICALS, INC.)
*[3] Bis[4-(3-maleimidephenoxy)phenyl]sulfide (available from MITSUI TOATSU CHEMICALS, INC.)
*[4] Bis(4-maleimidephenyl)methane (available from MITSUI TOATSU CHEMICALS, INC.)
*[5] Novolak phenol resin, PN (available from NIPPON KAYAKU Co., Ltd.)
*[6] Zailock XL-225 (available from MITSUI TOATSU CHEMICALS, INC.)
*[7] Rescorcin Zailock (available from MITSUI TOATSU CHEMICALS, INC.)
*[8] Ortho-cresol-novolak epoxy, EOCN-1020 (available from NIPPON KAYAKU Co., Ltd.)

TABLE II

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 | Comp. Ex. 3 | Comp. Ex. 4 | Test Method |
|---|---|---|---|---|---|---|---|---|---|---|---|---|---|---|---|---|---|
| Glass Transition Point (°C.) | 210 | 210 | 210 | 210 | 210 | 210 | 210 | 210 | 210 | 210 | 210 | 210 | 210 | 210 | 160 | 160 | TMA |
| Coefficient of Linear Thermal Expansion ($\times 10^{-5}$ °C.$^{-1}$) | 1.5 | 1.5 | 1.5 | 1.5 | 1.5 | 1.5 | 1.5 | 1.5 | 1.5 | 1.5 | 1.5 | 1.5 | 1.5 | 1.5 | 2.0 | 2.0 | TMA |
| Moisture Absorption (wt %) | 0.90 | 0.75 | 0.75 | 0.80 | 0.75 | 0.80 | 0.75 | 0.90 | 0.90 | 0.90 | 0.90 | 0.80 | 1.20 | 1.20 | 0.90 | 0.90 | 121° C. × 96 hrs |
| Spiral Flow (inch) | 37.4 | 35.4 | 43.3 | 43.3 | 51.2 | 51.2 | 51.2 | 35.4 | 37.4 | 35.4 | 37.4 | 51.2 | 27.6 | 27.6 | 47.2 | 47.2 | EMMI 1-66 |
| Flexural Modulus (kg/mm$^2$) | 1250 | 1200 | 1200 | 1200 | 1200 | 1200 | 1200 | 1000 | 1250 | 1000 | 1500 | 1500 | 1500 | 1250 | 1100 | 1500 | JIS K-6911 |
| Alumislide (μ) | 0 | 0 | 0 | 0 | 0 | 0 | 0 | 0 | 0 | 0 | 15 | 15 | 15 | 0 | 2 | 25 | See footnote (1) |
| V.P.S. Test | 1/20 | 0/20 | 0/20 | 0/20 | 0/20 | 0/20 | 0/20 | 0/20 | 2/20 | 0/20 | 2/20 | 2/20 | 20/20 | 20/20 | 20/20 | 20/20 | See |

TABLE II-continued footnote (2)

(1) Alumislide: Shift of a bonding pad portion (100 microns × 100 microns) at the corner of the test element observed after repeating, 1000 times, cooling (for 30 minutes at −65° C.) - heating (for 30 minutes at 150° C.) cycles.
(2) V.P.S. Test: The package was held, for 24 hours, in a Pressure-Cooker Tester maintained at 121° C. and 2 atms. and immediately thereafter was introduced into a bath of molten solder at 260° C. to count the number of test pieces which caused cracking. The numerator is the number of test pieces causing cracking and the denominator is the total number of the test pieces.

TABLE III

|  | Ex. 13 | Ex. 14 | Ex. 15 | Ex. 16 | Ex. 17 | Ex. 18 | Ex. 19 | Ex. 20 | Comp. Ex. 5 | Comp. Ex. 6 | Comp. Ex. 7 | Comp. Ex. 8 |
|---|---|---|---|---|---|---|---|---|---|---|---|---|
| Polymaleimide Compound*1 | 20 | 20 | 20 | 20 | 20 | 20 | 20 | 20 |  |  |  |  |
| Bismaleimide Compound*2 |  |  |  |  |  |  |  |  | 20 | 20 |  |  |
| Novolak Phenol Resin*3 | 3 |  |  |  |  |  |  | 3 | 3 | 3 | 10 | 10 |
| Phenol Aralkyl Resin*4 |  | 3 |  | 3 | 3 | 3 | 3 |  |  |  |  |  |
| Resorcinol Aralkyl Resin*5 |  |  | 3 |  |  |  |  |  |  |  |  |  |
| Epoxy Resin*6 |  |  |  |  |  |  |  |  | 7 | 7 |  | 20 |
| Modified Epoxy Resin a-1 | 7 | 7 | 7 |  |  |  |  |  |  |  | 7 |  |
| Modified Epoxy Resin a-2 |  |  |  | 7 |  |  |  |  |  |  | 20 |  |
| Modified Epoxy Resin a-3 |  |  |  |  | 7 |  |  |  |  |  |  |  |
| Modified Epoxy Resin a-4 |  |  |  |  |  | 7 | 7 |  |  |  |  |  |
| Fused Silica | 70 | 70 | 70 | 70 | 70 | 70 | 70 | 70 | 70 | 70 | 70 | 70 |
| Triphenylphosphine | 0.3 | 0.3 | 0.3 | 0.3 | 0.3 | 0.3 | 0.3 | 0.3 | 0.3 | 0.3 | 0.3 | 0.3 |
| Triethylammonium Tetraphenylborate |  | 1.0 |  | 1.0 | 1.0 |  | 1.0 | 1.0 |  |  |  |  |
| Dicumyl Peroxide | 0.2 |  | 0.2 |  |  | 0.2 |  |  | 0.2 | 0.2 |  |  |
| Silane Coupling Agent | 1.0 | 1.0 | 1.0 | 1.0 | 1.0 | 1.0 | 1.0 | 1.0 | 1.0 | 1.0 | 1.0 | 1.0 |
| Carnauba Wax | 0.3 | 0.3 | 0.3 | 0.3 | 0.3 | 0.3 | 0.3 | 0.3 | 0.3 | 0.3 | 0.3 | 0.3 |
| Carbon Black | 0.3 | 0.3 | 0.3 | 0.3 | 0.3 | 0.3 | 0.3 | 0.3 | 0.3 | 0.3 | 0.3 | 0.3 |
| Antimony Oxide | 1.5 | 1.5 | 1.5 | 1.5 | 1.5 | 1.5 | 1.5 | 1.5 | 1.5 | 1.5 | 1.5 | 1.5 |

*1 Polymaleimide compound having n in the general formula (I) of 3.0 on the average (available from MITSUI TOATSU CHEMICALS, INC.)
*2 Bis(4-maleimidephenyl)methane (available from MITSUI TOATSU CHEMICALS, INC.)
*3 Novolak phenol resin, PN (available from NIPPON KAYAKU Co., Ltd.)
*4 Zailock XL-225 (available from MITSUI TOATSU CHEMICALS, INC.)
*5 Resorcin Zailock (available from MITSUI TOATSU CHEMICALS, INC.)
*6 Ortho-cresol-novolak epoxy, EOCN-1020 (available from NIPPON KAYAKU Co., Ltd.)

TABLE IV

|  | Ex. 13 | Ex. 14 | Ex. 15 | Ex. 16 | Ex. 17 | Ex. 18 | Ex. 19 | Ex. 20 | Comp. Ex. 5 | Comp. Ex. 6 | Comp. Ex. 7 | Comp. Ex. 8 | Test Method |
|---|---|---|---|---|---|---|---|---|---|---|---|---|---|
| Glass Transition Point (°C.) | 210 | 200 | 220 | 200 | 200 | 200 | 200 | 210 | 210 | 210 | 160 | 160 | TMA |
| Coefficient of Linear Thermal Expansion ($\times 10^{-5}$ °C.$^{-1}$) | 1.5 | 1.5 | 1.5 | 1.5 | 1.5 | 1.5 | 1.5 | 1.5 | 1.5 | 1.5 | 2.0 | 2.0 | TMA |
| Moisture Absorption (wt %) | 0.95 | 0.85 | 0.80 | 0.85 | 0.85 | 0.85 | 0.85 | 0.95 | 1.20 | 1.20 | 0.90 | 0.90 | 121° C. × 96 hrs |
| Spiral Flow (inch) | 37.4 | 39.4 | 39.4 | 37.4 | 39.4 | 37.4 | 37.4 | 37.4 | 37.4 | 37.4 | 47.2 | 47.2 | EMMI 1-66 |
| Flexural Modulus (kg/mm$^2$) | 1250 | 1200 | 1200 | 1000 | 1200 | 1000 | 1000 | 1500 | 1500 | 1300 | 1100 | 1500 | JIS K-6911 |
| Alumislide (μ) | 0 | 0 | 0 | 0 | 0 | 0 | 0 | 15 | 15 | 0 | 2 | 25 | See footnote (1) |
| V.P.S. Test | 1/20 | 0/20 | 0/20 | 0/20 | 0/20 | 0/20 | 0/20 | 2/20 | 20/20 | 20/20 | 20/20 | 20/20 | See footnote (2) |

(1) Alumislide: Shift of a bonding pad portion (100 microns × 100 microns) at the corner of the test element observed after repeating, 1000 times, cooling (for 30 minutes at −65° C.) - heating (for 30 minutes at 150° C.) cycles.
(2) V.P.S. Test: The package was held, for 24 hours, in a Pressure-Cooker Tester maintained at 121° C. and 2 atms. and immediately thereafter was introduced into a bath of molten solder at 260° C. to count the number of test pieces which caused cracking. The numerator is the number of test pieces causing cracking and the denominator is the total number of the test pieces.

EFFECTS OF THE INVENTION

As has been explained above with reference to Examples and Comparative Examples, the resin composition for sealing semiconductors according to the present invention has a high glass transition point and exhibits low thermal expansion compared with conventional sealing resins principally composed of a polyfunctional epoxy resin or a novolak-phenol resin.

In addition, the resin composition of the invention has low water absorption and high flexibility compared with those of the sealing resins containing a bismaleimide beyond the scope of the present invention. Furthermore, those compositions which can impart excellent thermal resistance during soldering at 260° C. are only the resin compositions according to the present invention.

Therefore, if the resin composition of the invention is used to seal semiconductor devices on a large scale having high degree of integration or semiconductors for surface mounting, these semiconductors provide high reliability. Thus the present invention is highly industrially useful.

What is claimed is:

1. A resin composition for sealing semiconductors which comprises,
   (a) an epoxy resin wherein all or part of the epoxy resin is a modified epoxy resin composed of (1) a graft polymer of an epoxy resin and a vinyl polymer and (2) a silicone polymer in an oily state or as particles having an average particle size of not more than 1.0 micron,
   (b) a hardening agent,
   (c) an inorganic filler, and
   (d) a polymaleimide presented by the following general formula (I):

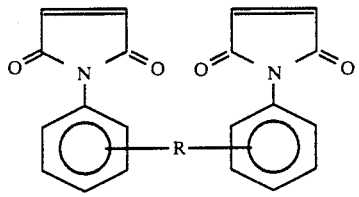

in formula (I), R represents a bivalent group selected from the group consisting of

and

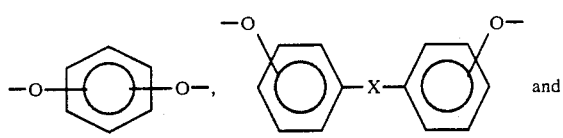

wherein X represents a direct bond, a bivalent hydrocarbon group having 1 to 10 carbon atoms, a hexafluorinated isopropylidene group, a carbonyl group, a thio group, a sulfinyl group, a sulfonyl group or an oxide, and n represents an average number of the units enclosed in brackets ranging from 0 to 10.

2. The resin composition for sealing semiconductors as set forth in claim 1 wherein the polymaleimide is a bismaleimide compound represented by the following general formula:

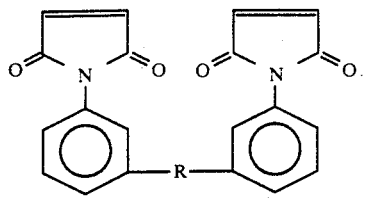

wherein R represents

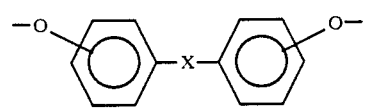 or

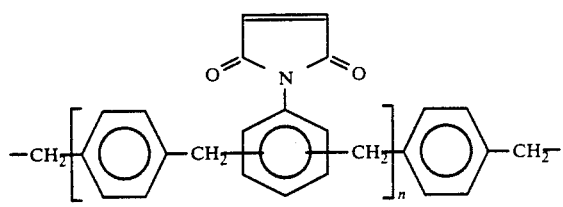

(in the formula, X has the same meaning as defined above).

3. The resin composition for sealing semiconductors as set forth in claim 1 wherein the polymaleimide is a member selected from those represented by the following general formula:

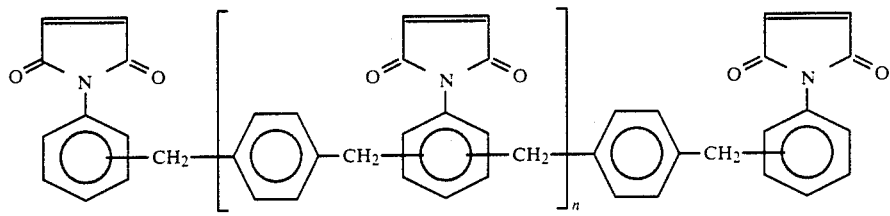

wherein n is an average number of the units enclosed in brackets ranging from 0 to 10.

4. The resin composition for sealing semiconductors of claim 1 wherein the polymaleimide is 4,4'-bis(3-maleimidephenoxy)biphenyl.

5. The resin composition for sealing semiconductors of claim 1 wherein the polymaleimide is 2,2-bis[4-(3-maleimidephenoxy)phenyl]propane.

6. The resin composition for sealing semiconductors of claim 1 wherein the polymaleimide is bis[4-(3-maleimidephenoxy)phenyl]sulfide.

7. The resin composition for sealing semiconductors of claim 1 wherein the epoxy resin is a cresol novolak epoxy resin.

8. The resin composition for sealing semiconductors of claim 1 wherein a vinyl monomer which is used to prepare the vinyl polymer is an acrylic ester.

9. The resin composition for sealing semiconductors of claim 1 wherein the amount of the vinyl polymer in the graft polymer of the epoxy resin and the vinyl polymer ranges from 1 to 50 parts by weight per 100 parts by weight of the epoxy resin.

10. The, resin composition for sealing semiconductors of claim 1 wherein silicone polymer is an addition-reacted silicone polymer.

11. The resin composition for sealing semiconductors of claim 1 wherein silicone polymer is a soft vinyl-modified silicone polymer.

12. The resin composition for sealing semiconductors of claim 11 wherein the soft vinyl-modified silicone polymer is selected from the group consisting of homopolymers and copolymers of vinyl-modified silicones and copolymers of the vinylmodified silicones and other vinyl monomers 13. The resin composition for sealing semiconductors of claim 12 wherein the vinyl-modified silicone is a methacryloxypropyl siloxane represented by the general formula:

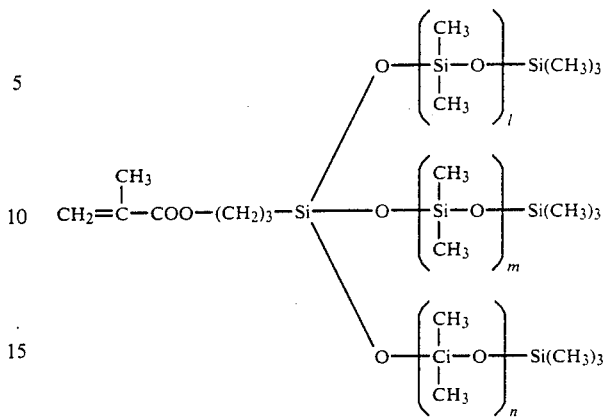

wherein $0 \leq l, m, n \leq 1000$.

14. The resin composition for sealing semiconductors of claim 1 wherein the average particle size of the silicone polymer is not more than 0.5 micron.

15. The resin composition for sealing semiconductors of claim 1 wherein the hardening agent is novolak phenol resin and/or phenol aralkyl resin.

16. The resin composition for sealing semiconductors of claim 1 wherein the amount of the hardening agent ranges from 0.1 to 10 expressed in equivalent weight ratio based on the epoxy resin.

17. The resin composition for sealing semiconductors of claim 1 wherein the inorganic filler is crystalline and/or fused silica.

18. The resin composition for sealing semiconductors of claim 4 wherein the amount of the inorganic filler ranges from 100 to 800 parts by weight per 100 parts by weight of the sum of the epoxy resin, the hardening agent and the polymaleimide.

* * * * *

UNITED STATES PATENT AND TRADEMARK OFFICE
CERTIFICATE OF CORRECTION

PATENT NO. : 5,015,674

DATED : May 14, 1991

INVENTOR(S) : Machida et al.

It is certified that error appears in the above-identified patent and that said Letters Patent is hereby corrected as shown below:

In column 18, line 63, after "The" delete ",".

In column 20, line 15, amend "Ci" to --Si--.

Signed and Sealed this

First Day of February, 1994

Attest:

BRUCE LEHMAN

Attesting Officer

Commissioner of Patents and Trademarks